United States Patent
Eriksson et al.

(10) Patent No.: US 9,629,101 B1
(45) Date of Patent: Apr. 18, 2017

(54) ADJUSTMENT OF BLUETOOTH (BT) GOLDEN RECEPTION RANGE IN THE PRESENCE OF LONG TERM EVOLUTION (LTE) INTERFERENCE

(71) Applicant: Intel IP Corporation, Santa Clara, CA (US)

(72) Inventors: Hakan Magnus Eriksson, Hillsboro, OR (US); Dongsheng Bi, Fremont, CA (US); Karthik Malurpatna Chamaraj, Santa Clara, CA (US)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 14/871,899

(22) Filed: Sep. 30, 2015

(51) Int. Cl.
*H04W 52/24* (2009.01)
*H04W 4/00* (2009.01)
*H04W 16/14* (2009.01)
*H04W 84/04* (2009.01)

(52) U.S. Cl.
CPC ......... *H04W 52/241* (2013.01); *H04W 4/008* (2013.01); *H04W 16/14* (2013.01); *H04W 84/042* (2013.01)

(58) Field of Classification Search
CPC .... H04W 52/241; H04W 4/008; H04W 16/14
See application file for complete search history.

(56) References Cited

U.S. PATENT DOCUMENTS

| | | | | |
|---|---|---|---|---|
| 2007/0298714 | A1* | 12/2007 | Chiu | H01Q 1/2275 455/41.2 |
| 2011/0312288 | A1* | 12/2011 | Fu | H04B 1/406 455/88 |
| 2012/0213172 | A1* | 8/2012 | Kim | H04W 52/146 370/329 |
| 2012/0329515 | A1* | 12/2012 | Husted | H04W 52/226 455/552.1 |
| 2013/0196654 | A1 | 8/2013 | Wietfeldt | |
| 2014/0050146 | A1* | 2/2014 | Chrisikos | H04W 16/14 370/328 |
| 2016/0021488 | A1* | 1/2016 | Viswanadham | H04W 8/005 455/41.2 |

OTHER PUBLICATIONS

Bluetooth, "Specification of the Bluetooth System", vol. 4.1, Dec. 3, 2013, 2684 pages.
Extended European Search report received for European Patent Application No. 16185784.2, mailed on Feb. 13, 2017, 7 pages.
Kneeland, et al., "Performance Evaluation and Analysis of Effective Range and Data Throughput for Unmodified Bluetooth Communication Devices", IEEE, 2003, pp. 665-671.

* cited by examiner

*Primary Examiner* — Christopher M Brandt
(74) *Attorney, Agent, or Firm* — Forefront IP Lawgroup of Christie and Rivera, PLLC

(57) ABSTRACT

Described herein are methods, architectures and platforms for adjusting a reception range at which remote devices transmit to a Bluetooth receiver, by determining wireless radio interference to the Bluetooth receiver. The reception range is adjusted per the wireless radio interference.

20 Claims, 6 Drawing Sheets

ADJUSTMENT OF BLUETOOTH (BT) GOLDEN RECEPTION RANGE IN THE PRESENCE OF LONG TERM EVOLUTION (LTE) INTERFERENCE

BACKGROUND

In wireless devices, Bluetooth (BT) and Long Term Evolution (LTE) modems (radios) can be located on the same device platform. When an LTE modem (radio) operates in an adjacent band next to the ISM (industrial, scientific, and medical) band where BT operates, then the LTE transmissions will affect BT reception. For example, BT operates within 2402-2480 MHz band and LTE may operate on Adjacent Bands such as Band 40 (2300-2400 MHz), Band 7 (2500-2570 MHz), Band 38 (2570-2620 MHz) or Band 41 (2496-2690 MHz).

The Bluetooth special interest group (SIG) defines a coexistence framework to allow collocated wireless devices to communicate to each other as to BT and wireless (e.g., LTE) transmission and reception activities. The transmission power and reception conditions are quite dynamic for both BT and LTE systems. Since LTE transmission and reception are controlled by a network (i.e., cellular network), and BT transmission and reception control is local amongst the connected devices, LTE traffic has higher priority than Bluetooth traffic which means that BT packets may get negatively affected. This can result in performance degradation for the BT device, such as BT data packet loss which can affect user experience.

In operation, BT transmission and reception power can be controlled by a remote device (e.g., headset, speaker, etc.) that is accessed by a wireless device. In particular, the remote wireless device determines whether power is to be increased or decreased the remote wireless device to maintain traffic between the wireless device and remote device. BT traffic between the wireless device and remote devices may operate within what is termed as a golden reception range.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Described herein are architectures, platforms and methods to dynamically adjust Bluetooth (BT) golden reception range by accounting for long term evolution (LTE) interference. In particular, a remote device that is accessed by a wireless device is requested to adjust its output power to adjust to collocated LTE interference and support the BT golden reception range.

Figure 1:
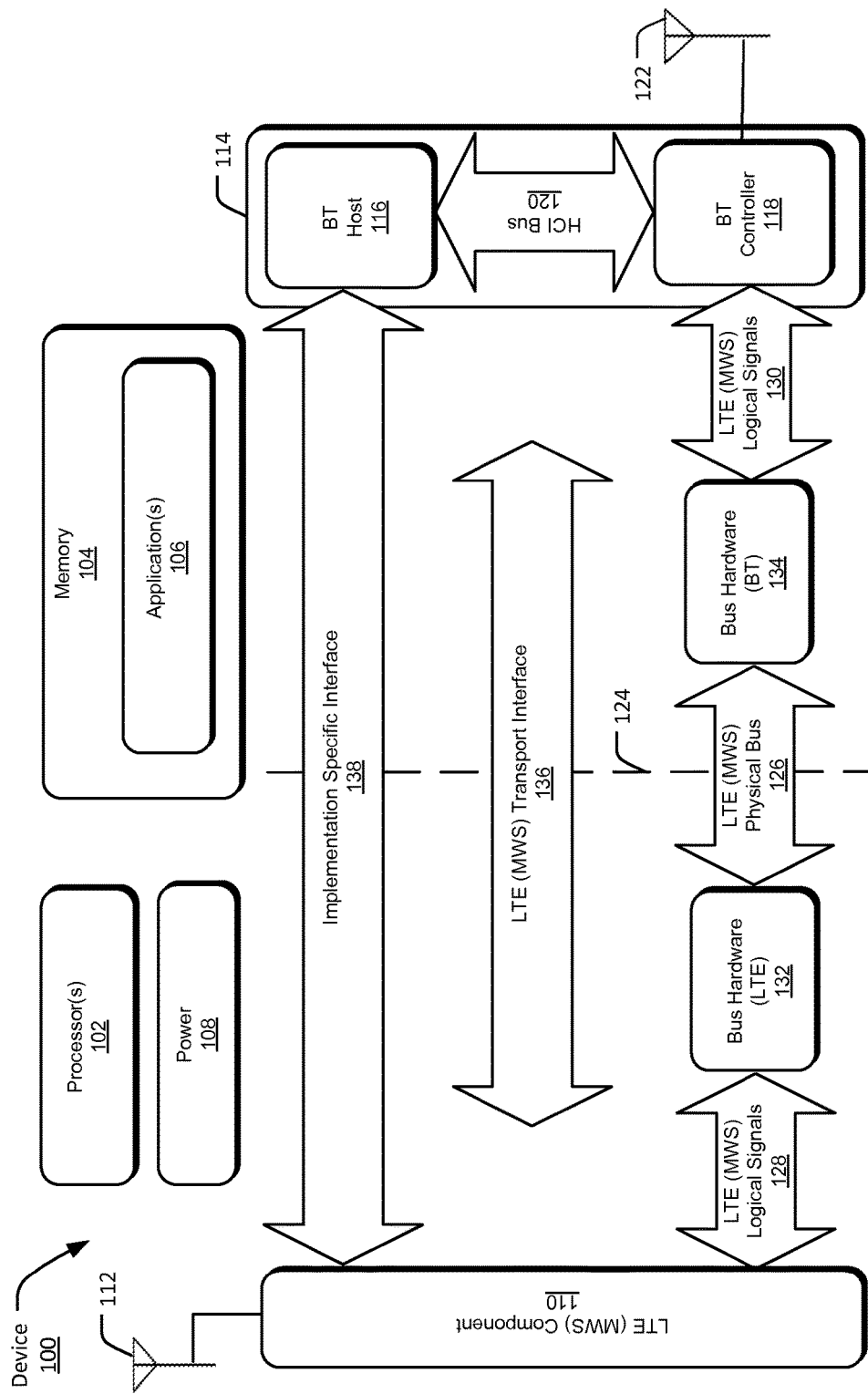
FIG. 1 is an example block diagram of a wireless device that implements Bluetooth (BT) golden reception range adjustment in the presence of Long Term Evolution (LTE) interference.

FIG. 1 is an example wireless device 100 that illustrates Bluetooth (BT) golden reception range adjustment in the presence of Long Term Evolution (LTE) interference. The wireless device 100 may include, but is not limited to, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like.

The wireless device 100 includes one or more processors 102, and memory 104 coupled to the one or more processors 102. Memory 104 can be non-transitory memory/media that includes various types of storage, including read only, random access and the like. Memory 104 may also include programmable/non-programmable firmware. Particular elements described herein as hardware may be implemented as firmware as part of memory 104. Memory 104 may particularly include applications 106 such as BT golden reception range adjustment in the presence of LTE interference applications.

The wireless device 100 may include a power component 108. Power component 108 may include various AC and/or DC elements, such as batteries. Power component 108 drives and provides power to various other components of wireless device 100.

Wireless device 100 may include multiple collocated radio or modem systems. In this example, wireless device 100 includes an LTE or MWS (Mobile Wireless Standards) radio (modem) or component 110 used to communicate LTE data. The LTE component 110 is connected to an antenna 112 used for LTE traffic. LTE is described as an example herein; however, it is to be understood that other wireless standards are applicable, and particularly standards related to mobile wireless (MWS).

Wireless device 100 further includes a BT radio (modem) or component 114. The BT component 114 includes a BT host 116 and BT controller 118. The BT host 116 is connected to the BT controller 118 by a host controller or HCI Bus 120. The BT controller 118 is connected to an antenna 122 used for BT traffic.

The golden reception range depends on desired signal strength between the wireless device 100 and remote devices. For example, if reception level is below the golden reception range, a remote device may be instructed to increase power to maintain reception by the wireless device.

Therefore, BT reception in a wireless device may be determined by signal strength of a desired signal, such as being in the golden reception range. In addition, BT reception in a wireless device may also be determined by interference from a collocated LTE modem (radio) or LTE component 110, which raises the noise floor of the BT reception. Golden reception may be measured in dBm, and an example may be minus 50 dBm to minus 70 dBm.

The amount of interference that affects BT component 114 reception can depend on various factors, such as the receive situation of the BT modem (radio) or component 114 that acts as a "victim" to the collocated LTE modem (radio) or component 110. Other factors can include collocated filters (components that are not shown), LTE component 110 transmission power level and channel frequency. Such factors, and particularly LTE component 110 transmission power level and channel frequency, may be determined by an external network (e.g., cellular telephone network). BT component 114 reception may be determined by a desired signal level (i.e., golden reception range) and a noise floor level that includes the LTE component 110 interference. The desired signal level (i.e., golden reception range) may be determined by transmission power of a remotely accessed device transmission and path loss from transmitter to receiver.

In order to mitigate the interference from LTE component 110 to BT component 114 reception, wireless device 100 can adjust its golden reception range (e.g., shift higher) which will request a remote device to boost transmission power such that the lower limit of the golden range will provide enough signal-to-noise-ratio even in presence of LTE component 110 interference of the wireless device 100. The wireless device 100 provides a transmission power request (demand, value, etc.) to the remote devices; such that the signal received by the wireless device and transmitted by the remote devices (when transmitting at said level) has at least a minimum level of SNR.

LTE component 110 traffic is independent of BT component 114 traffic. Interference from LTE component 110 may take place when BT component 114 reception collides with LTE component 110 transmission. Dynamically adjusting the golden reception range by considering LTE component 110 interference can improve overall system (i.e., wireless device 100) performance and make the system more robust when LTE component 110 is active.

Collocated LTE component 110 and BT component 114 may be defined by a hardware boundary as represented by line 124. LTE component 110 and BT component 114 can exchange real time (RT) messages through MWS Coexistence Physical Bus Interface or physical bus 126. Logical signals 128 are passed and received by LTE component 110 and logical signals 130 are passed and received by BT component 114 through physical bus 126. Dedicated bus hardware 132 may be provided for LTE component 110, and dedicated bus hardware 134 may be provided for BT component 114.

Examples of messages exchanged between LTE component 110 and BT component 114 include transmit (TX), receive (RX) and frame information from the LTE component 110. Messages from the BT component 114 can include messages indicating high priority traffic, and request to the LTE component to yield air interface in the event of a conflict.

An LTE (MWS) interface 136 is provided. The LTE (MWS) interface 136 may be a Non Real Time (NRT) interface which is routed over a host interface where status information is exchanged, such as current LTE operational band and channels. In addition, an implementation specific interface 138 is provided.

Through the various interfaces/buses 126, 136 and 138, LTE component 110 and BT component 114 can communicate to adjust BT golden reception range adjustment in the presence of LTE interference. The interfaces/buses allow the LTE component 110 and BT component 114 to exchange information and support cooperative coexistence.

As discussed above, due to the network restriction (e.g., cellular telephone network) of an LTE system (i.e., LTE component 110), the arbitration between LTE component 110 and BT component 114 favors or prioritizes LTE component 110. For example, in light of such network restrictions, less than 10% of the LTE traffic may be allowed to lose in the arbitration. In other words, whenever there are interferences between LTE component 110 and BT component 114, the BT component 114 is more likely to be the victim, where either BT transmission (Tx) is cut or BT reception (Rx) gets negatively affected. This can result in performance degradation of BT communication, due to multiple retransmissions. In an example scenario, when BT component 114 performs a reception (Rx) transaction, BT component 114 raises a priority requests for the most important traffic types, and requesting LTE component 110 to terminate transmission. BT reception packets can be corrupted in such a coexistence scheme whenever priority requests are denied.

By effectively implementing a power control scheme to increase or decrease transmission power at a remote device, efficient communication of LTE and BT traffic may be realized. To achieve an acceptable link, a determination is performed as to a maximum noise level on the BT channels introduced by LTE transmissions. Adjustment is made to the BT golden reception range accordingly to mitigate the impact from LTE interference.

Figure 2:
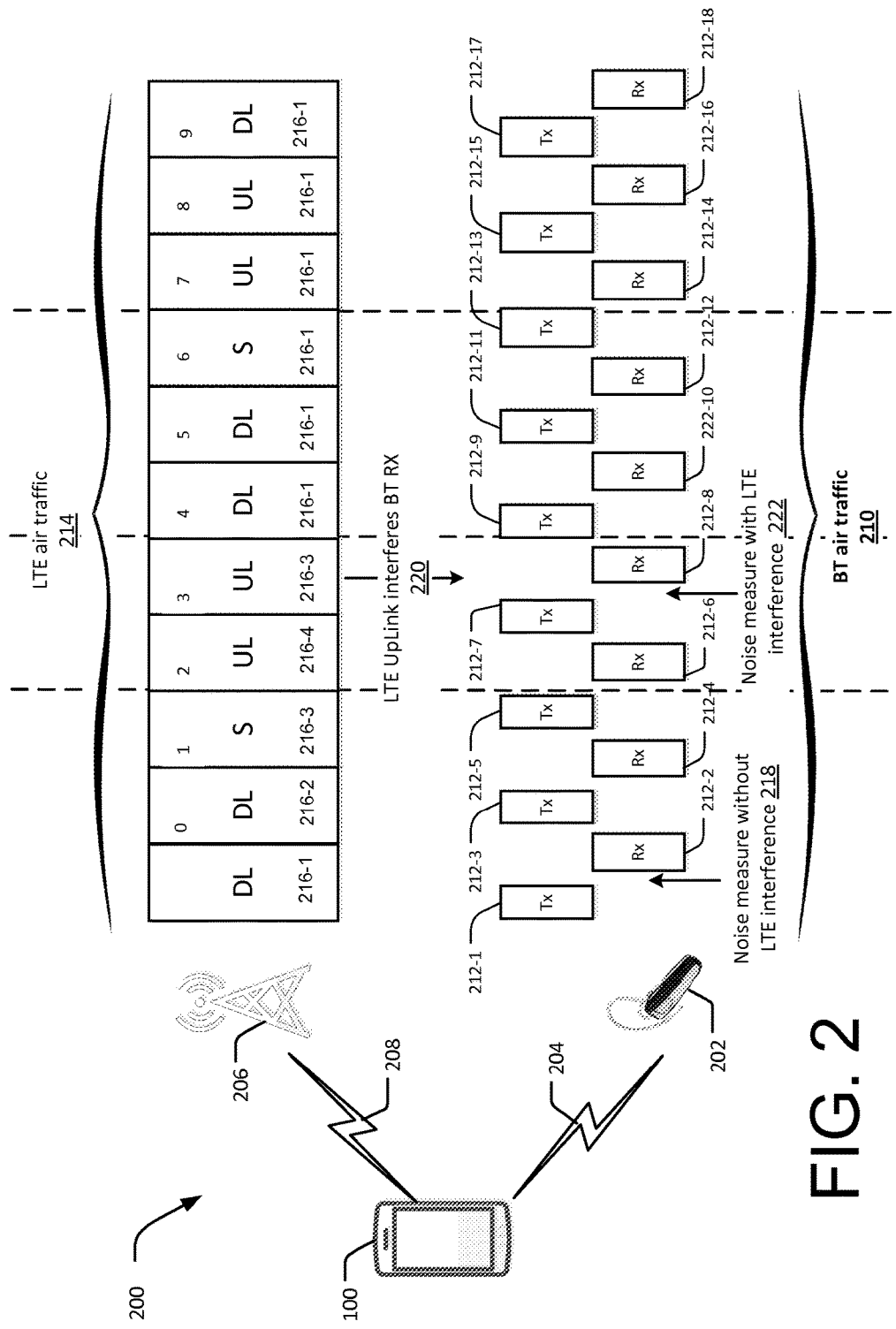
FIG. 2 is an example block diagram of a system that implements Bluetooth (BT) golden reception range adjustment in the presence of Long Term Evolution (LTE) interference.

FIG. 2 is an example system 200 that implements BT golden reception range adjustment in the presence of LTE interference. In this example, wireless device 100 communicates to a remote device 202. Traffic between wireless device 100 and remote device 202 is through BT channels represented by link 204. Wireless device 100 communicates to a network, such as a cellular network as represented by base station 206. Traffic between wireless device 100 and base station 206 is through LTE channels represented by link 208.

BT traffic 210 between wireless device 100 and remote device 202 is shown as a series of transmit and receive packets 212. LTE traffic 214 between wireless device 100 and remote device 202 is shown as a series downlink (DL), uplink (UL) and special subframe (S) packets 216.

In this example, LTE transmissions are dictated by the LTE network (i.e., base station 206). The LTE transmissions may be quite dynamic. For example, the base station 206 may assign the number of resource blocks used for data uplink (UL) based on a particular application. If there is relatively little uplink data except to acknowledge the downlink (DL) data reception, the LTE transmit (TX) or LTE component 110, may only use the Physical Uplink Control Channel (PUCCH) with a few resource blocks.

In order to determine noise level measurement without LTE interference, for certain implementations, noise level measurement can be evaluated right after a BT transmit (Tx), and while the LTE system or LTE component 110 is either receiving (i.e., DL or S) or transmitting (UL). This measurement is represented by point in time 218. In this example, this is performed after Tx packet 212-1 from BT component 114, and during DL packet 216-1 from LTE component 110.

In order to determine noise level measurement with LTE interference, for certain implementations, noise level measurement be performed while the LTE component 110 is transmitting (i.e., in UL) as represented by point in time 220 (LTE UL interferes with BT Rx) and 222 (noise measure with LTE interference). In this example, this is performed after Tx packet 212-7 from BT component 114, and during UL packet 216-3 from LTE component 110.

Impact of LTE component 110 (LTE radio/modem) may be characterized by assuming the worst case scenario at maximum LTE transmit power and a number of resource blocks used. Such characterization data may be provided to BT component 114 (e.g., BT controller 118) with the use of non real time (NRT) messages.

Figure 3:
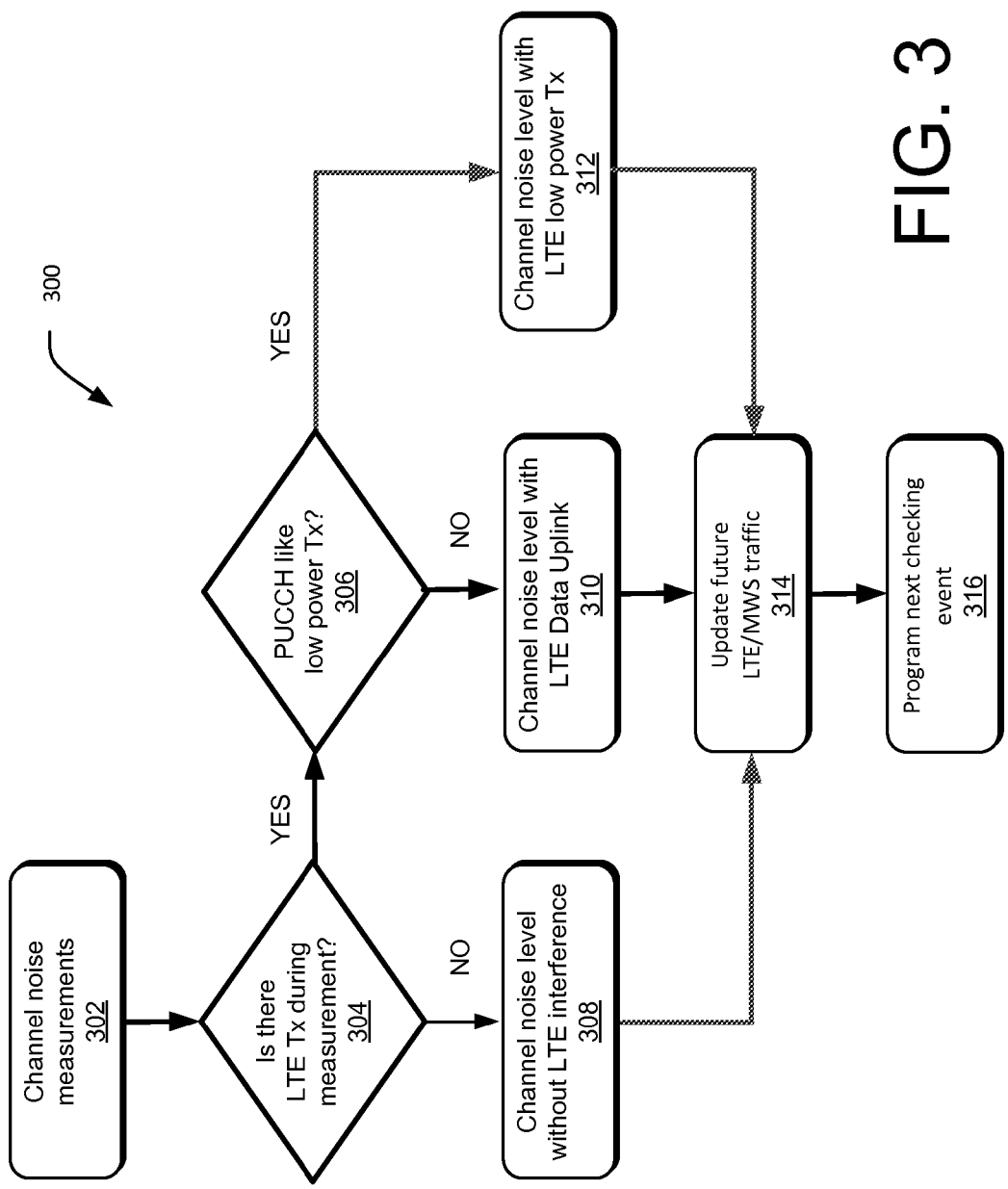
FIG. 3 is an example process flow illustrating an example method for channel noise estimation.

FIG. 3 shows an example process flow 300 illustrating an example method for channel noise estimation. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

If the characterization data is not available, the BT component 114 and particularly BT controller 118 can measure the LTE impact/interference dynamically. When the BT controller 118 performs channel noise measurements, the BT controller 118 can also check the existence of LTE transmissions based on real time (RT) signaling as shown by process 300. To further distinguish PUCCH Tx and other low power Tx with regular data TX, an additional indication can be added in the RT signaling.

At block 302, channel noise measurements are performed. As discussed, the channel noise measurements can be performed by the BT component 114, and particularly the BT controller 118.

At block 304 a determination is performed as to whether a LTE transmission is being performed. If there is an LTE transmission being performed, then following the YES branch of block 304, a determination is made as to PUCCH or other low power like transmission.

If there is no LTE transmission being performed, the following the NO branch of block 304, at block 308, channel noise level without LTE interference is performed.

If there is no PUCCH or similar low power transmission as determined at block 306, then following the NO branch of block 306, at block 310 channel noise level with LTE data uplink is performed. If there is a determination as to PUCCH or similar low power transmission as determined at block 306, then following the YES branch of block 306, at block 312 channel noise level with LTE low power transmission is performed.

At block 314, future or subsequent LTE (MWS) traffic is updated or accounted for.

At block 316, next checking event(s) is performed.

Figure 4:
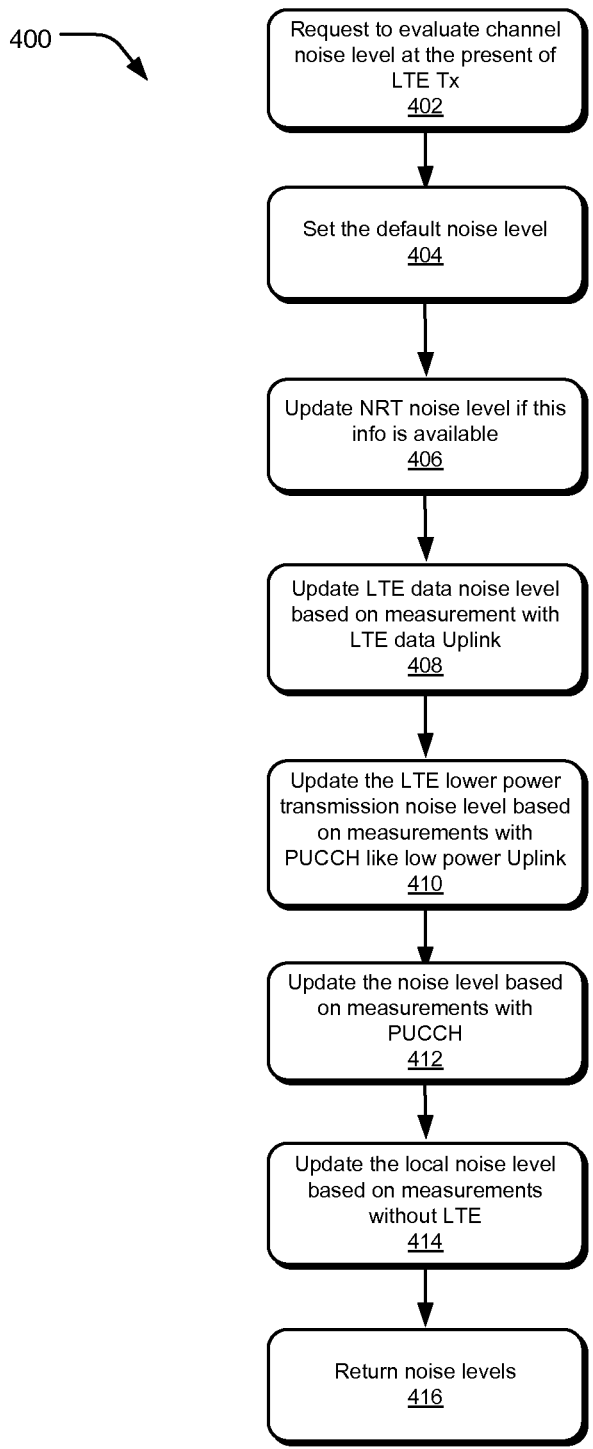
FIG. 4 is an example process flow illustrating an example method for noise level determination.

FIG. 4 shows an example process flow 400 illustrating an example method for noise level determination. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

Process 400 is used to determine LTE impact/interference on BT reception, and to particularly determine noise levels introduced by LTE (e.g., LTE component 110). In order to correctly identify the LTE impact on the BT reception, the process 400 is used to determine the noise levels introduced by LTE component 110.

At block 402, a request is made to evaluate channel noise level with presence of LTE transmission.

At block 404, a default noise level as to LTE interference/impact is set.

At block 406, NRT information is checked regarding LTE noise level and NRT noise level is updated if the information is available. A worst case offline measurement is provided.

At block 408, noise measurement is taken as to presence of an LTE data uplink, and an update is performed as to the LTE data noise level based on the presence of LTE data uplink.

At block 410, noise level measurements based on low power LTE transmissions, such PUCCH are performed. The noise levels as low power LTE transmissions are updated.

At block 412, noise level based on measurements with PUCCH is updated.

At block 414, local noise level based measurements without LTE transmission is performed.

If the measurement data are sufficient, the pre-existing noise level is preferred. Based on the LTE traffic load and BT traffic load, a decision is made as to using LTE data transmit (Tx) noise level or low power transmit (Tx) noise level. If neither of the measurements is not available the regular noise measurements or the default value will be considered.

At block 416, noise levels are returned.

Figure 5:
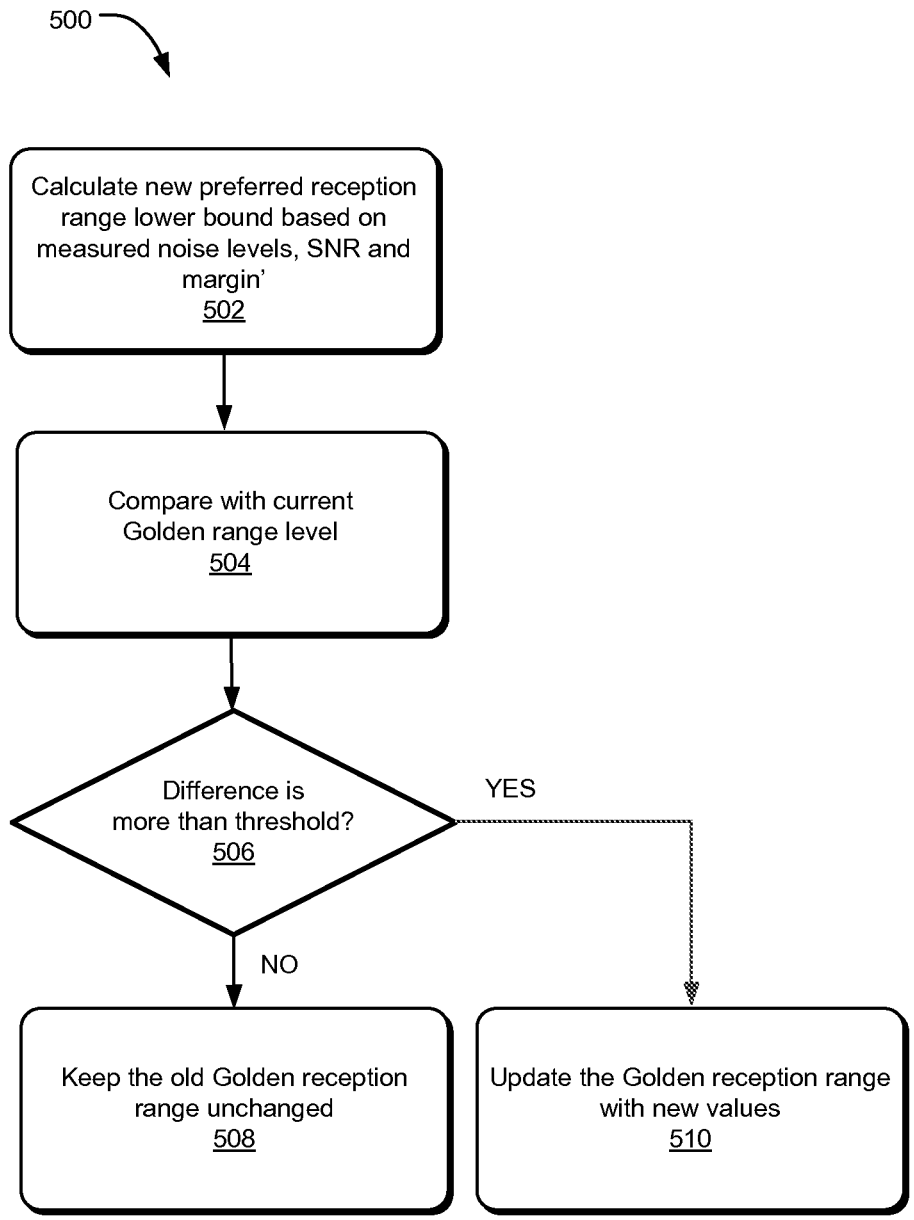
FIG. 5 is an example process flow illustrating an example method for Bluetooth golden reception range adjustment.

FIG. 5 shows an example process flow 500 illustrating an example method for adjusting BT golden reception range. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

Once a BT radio/modem, such as BT component 114 (i.e., BT controller 118) acquires the noise level introduced by LTE (i.e., LTE component 110), the BT radio/modem can calculate a new lower bound of the BT golden reception range. The typical lower bound of the BT golden reception range may be the sum of the noise level, the BT radio/modem's signal to noise ratio (SNR) requirement and a fixed safe margin. Once the lower bound is determined, the upper bound is typically a fixed offset from the lower bound.

At block 502, a preferred new BT golden reception range based on measured noise levels, BT radio/modem's signal to noise ratio (SNR) requirement and a fixed safe margin is calculated.

At block 504, the BT golden reception range determined at block 502 is compared with a current BT golden reception range.

A determination is performed at block 506, if the new BT golden reception range is shifted higher than the current BT golden reception range.

If the new BT golden reception range is not more than the current BT golden reception range, then following the NO branch of block 506, at block 508, the current or old values of the new BT golden reception range is left.

If the new BT golden reception range is more than the current BT golden reception range, then following the YES branch of block 506, at block 510, the new values are used for the BT golden reception range.

Figure 6:
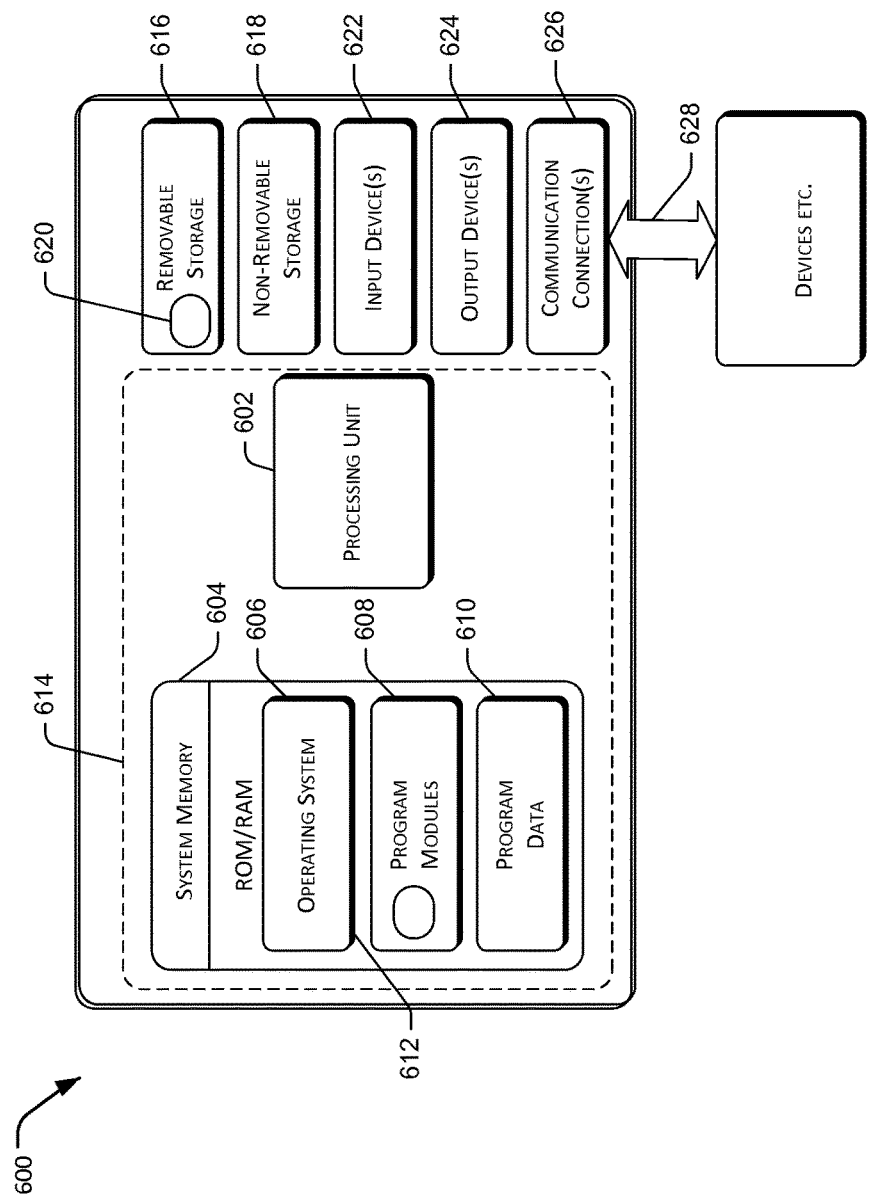
FIG. 6 is an example system that may be utilized to implement Bluetooth (BT) golden reception range adjustment in the presence of Long Term Evolution (LTE) interference.

FIG. 6 is an example system that may be utilized to implement various described embodiments. However, it will be readily appreciated that the techniques disclosed herein may be implemented in other computing devices, systems, and environments. The computing device 600 shown in FIG. 6 is one example of a computing device and is not intended to suggest any limitation as to the scope of use or functionality of the computer and network architectures.

In at least one implementation, computing device 600 typically includes at least one processing unit 602 and system memory 604. Depending on the exact configuration and type of computing device, system memory 604 may be volatile (such as RAM), non-volatile (such as ROM, flash memory, etc.) or some combination thereof. System memory 604 may include an operating system 606, one or more program modules 608, and may include program data 610. A basic implementation of the computing device 600 is demarcated by a dashed line 614.

The program module 608 may include a module 612. For example, the module 612 may carry out one or more of the method 400, and variations thereof, e.g., the computing device 600 acting as described above with respect to the device 100.

Computing device 600 may have additional features or functionality. For example, computing device 600 may also include additional data storage devices such as removable storage 616 and non-removable storage 618. In certain implementations, the removable storage 616 and non-removable storage 618 are an example of computer accessible media for storing instructions that are executable by the processing unit 602 to perform the various functions described above. Generally, any of the functions described with reference to the figures may be implemented using software, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that may be used to store information for access by a computing device, e.g., computing device 600 and device 100. Any of such computer accessible media may be part of the computing device 600.

In one implementation, the removable storage 616, which is a computer accessible medium, has a set of instructions 620 stored thereon. When executed by the processing unit 602, the set of instructions 620 cause the processing unit 602 to execute operations, tasks, functions and/or methods as described above, including methods 400 and 500 and any variations thereof.

Computing device 600 may also include one or more input devices 622 such as keyboard, mouse, pen, voice input device, touch input device, etc. Computing device 600 may additionally include one or more output devices 622 such as a display, speakers, printer, etc.

Computing device 600 may also include one or more communication connections 626 that allow the computing device 600 to communicate wirelessly with one or more other wireless devices, over wireless connection 628 based on near field communication (NFC), Wi-Fi, Bluetooth, radio frequency (RF), infrared, or a combination thereof.

It is appreciated that the illustrated computing device 600 is one example of a suitable device and is not intended to suggest any limitation as to the scope of use or functionality of the various embodiments described.

Unless the context indicates otherwise, the term "Universal Resource Identifier" as used herein includes any identifier, including a GUID, serial number, or the like.

In the above description of example implementations, for purposes of explanation, specific numbers, materials configurations, and other details are set forth in order to better explain the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques", for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more", unless specified otherwise or clear from context to be directed to a singular form.

These processes are illustrated as a collection of blocks in a logical flow graph, which represents a sequence of operations that may be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks may be combined in any order to implement the processes or an alternate process. Additionally, individual blocks may be deleted from the processes without departing from the spirit and scope of the subject matter described herein.

The term "computer-readable media" includes computer-storage media. In one embodiment, computer-readable media is non-transitory. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

Unless the context indicates otherwise, the term "logic" used herein includes hardware, software, firmware, circuitry, logic circuitry, integrated circuitry, other electronic components and/or a combination thereof that is suitable to perform the functions described for that logic.

The following examples pertain to further embodiments:

Example 1 is a method of adjusting a reception range for a Bluetooth (BT) radio collocated with a wireless radio comprising: determining a current reception range for one or more remote devices to connect with the BT radio; determining noise level from the wireless radio affecting the BT radio; updating the current reception range with the determined noise level; and determining whether to change the reception range based on the difference of the current reception range and the updated reception range.

In example 2, the method of example 1, wherein the determining noise level is performed with wireless radio transmission.

In example 3, the method of example 2 further comprising determining noise level accounting for low power channel transmission.

In example 4, the method of example 1, wherein the determining noise level is performed when wireless radio transmission is inactive.

In example 5, the method of example 1, wherein the determining noise level is performed using non real time (NRT) information received by the wireless radio.

In example 6, the method of example 1 further comprising updating wireless radio traffic as to determined noise level.

In example 7, the method of example 1, wherein the adjusting the desired reception range for the BT radio is performed periodically.

In example 8, the method of example 1, wherein the wireless radio is a 4G/LTE radio.

In example 9, the method of any of examples 1 to 8 further comprising providing the determined reception range to the one or more remote devices to allow the one or more remote devices to transmit in the determined reception range.

Example 10 is a wireless device comprising: one or more processors; memory configured to the one or more processors; a wireless radio configured to the one or more processors and memory, and configured to communicate with a network, that receives uplink and downlink traffic from the network, wherein noise measurement is determined when the wireless radio is operating; a Bluetooth (BT) radio collocated with the wireless radio, configured to communicate with one or more remote devices, wherein the BT radio provides a transmission power to the one or more remote devices to transmit, the reception range adjusted per the noise measurement of the wireless radio.

In example 11, the wireless device of example 10, wherein the noise measurement is determined when the wireless radio is transmitting.

In example 12, the wireless device of example 11, wherein the wireless radio communicates over one or more low power channels to the network, and noise measurement accounts for transmission over the one or more low power channels.

In example 13, the wireless device of example 10, wherein the noise measurement is determined when the wireless radio is inactive.

In example 14, the wireless device of example 10, wherein the wireless radio and BT radio communicate and exchange information over one or more dedicated interfaces.

In example 15, the wireless device of any of examples 10 to 14, wherein the wireless radio receives non real time (NRT) messages related to noise level.

Example 16 is non-transitory computer readable media to perform a method comprising: determining a reception range for one or more remote devices to connect with a Bluetooth (BT) radio; determining noise level from a collocated wireless radio affecting the BT radio; adjusting the reception range with the determined noise level; and changing the reception range if a difference as to a set threshold is determined.

In example 17, the non-transitory computer readable media of example 16, wherein the noise level is determined when the wireless radio is not transmitting.

In example 18, the non-transitory computer readable media of example 16, wherein the noise level is determined when the wireless radio is transmitting.

In example 19, the non-transitory computer readable media of example 16, further comprising receiving of non real time (NRT) information as to noise level.

In example 18, the non-transitory computer readable media of any of examples 16 to 19 further comprising providing the changed reception range to the one or more remote devices to allow the one or more remote devices to transmit in the determined reception range.

What is claimed is:

1. A method of adjusting a reception range for a Bluetooth (BT) radio collocated with a wireless radio comprising:
   determining a current reception range for one or more remote devices to connect with the BT radio;
   determining noise level from the wireless radio affecting the BT radio;
   updating the current reception range with the determined noise level; and
   determining whether to change the reception range based on the difference of the current reception range and the updated reception range.

2. The method of claim 1, wherein the determining noise level is performed with wireless radio transmission.

3. The method of claim 2, further comprising determining noise level accounting for low power channel transmission.

4. The method of claim 1, wherein the determining noise level is performed when wireless radio transmission is inactive.

5. The method of claim 1, wherein the determining noise level is performed using non real time (NRT) information received by the wireless radio.

6. The method of claim 1, further comprising updating wireless radio traffic as to determined noise level.

7. The method of claim 1, wherein the adjusting the desired reception range for the BT radio is performed periodically.

8. The method of claim 1, further comprising providing the determined reception range to the one or more remote devices to allow the one or more remote devices to transmit in the determined reception range.

9. The method of claim 1, wherein the wireless radio is a 4G/LTE radio.

10. A wireless device comprising:
    one or more processors;
    memory configured to the one or more processors;
    a wireless radio configured to the one or more processors and memory, and configured to communicate with a network, that receives uplink and downlink traffic from the network, wherein noise measurement is determined when the wireless radio is operating;

a Bluetooth (BT) radio collocated with the wireless radio, configured to communicate with one or more remote devices, wherein the BT radio provides a transmission power to the one or more remote devices to transmit, the reception range adjusted per the noise measurement of the wireless radio.

11. The wireless device of claim 10, wherein the noise measurement is determined when the wireless radio is transmitting.

12. The wireless device of claim 11, wherein the wireless radio communicates over one or more low power channels to the network, and noise measurement accounts for transmission over the one or more low power channels.

13. The wireless device of claim 10, wherein the noise measurement is determined when the wireless radio is inactive.

14. The wireless device of claim 10, wherein the wireless radio and BT radio communicate and exchange information over one or more dedicated interfaces.

15. The wireless device of claim 10, wherein the wireless radio receives non real time (NRT) messages related to noise level.

16. Non-transitory computer readable media to perform a method comprising:

determining a reception range for one or more remote devices to connect with a Bluetooth (BT) radio;

determining noise level from a collocated wireless radio affecting the BT radio;

adjusting the reception range with the determined noise level; and changing the reception range if a difference as to a set threshold is determined.

17. The non-transitory computer readable media of claim 16, wherein the noise level is determined when the wireless radio is not transmitting.

18. The non-transitory computer readable media of claim 16, wherein the noise level is determined when the wireless radio is transmitting.

19. The non-transitory computer readable media of claim 16, further comprising receiving of non real time (NRT) information as to noise level.

20. The non-transitory computer readable media of claim 16, further comprising providing the changed reception range to the one or more remote devices to allow the one or more remote devices to transmit in the determined reception range.

* * * * *